March 27, 1951    L. M. THIAC ET AL    2,546,800
PIE LOCK
Filed June 29, 1949

INVENTORS
Lillian Miller Thiac
Arthur J. Petivan, Jr.
BY Victor J. Evans & Co.

ATTORNEYS

Patented Mar. 27, 1951

2,546,800

UNITED STATES PATENT OFFICE 2,546,800

PIE LOCK

Lillian Miller Thiac and Arthur J. Petivan, Jr.,
New Orleans, La.

Application June 29, 1949, Serial No. 102,044

2 Claims. (Cl. 65—12)

Our present invention relates to an improved kitchen utensil of the type designed to protect the faces of pies and similar pastries after one or more slices have been cut and removed.

Conventionally a pie is baked in a pie plate of metal or glas and if not immediately cut into slices and all slices removed, the remainder of the pie is left unprotected at its two open faces allowing the filling to deteriorate or in the case of fruit pies, to allow the filling to run out of the shell.

According to our invention after the removal of one or more slices, the protector of our invention is placed in the triangular cavity and the adjustable walls are spread on their pivot to abut the open faces of the cut pie and protect and retain the filling In the accompanying drawings we have illustrated one complete example of the physical embodiment of our invention according to the best mode we have thus far devised, but it will be understood that various changes and alterations may be made in the exemplified structure within the scope of the appended claims.

Figure 1:
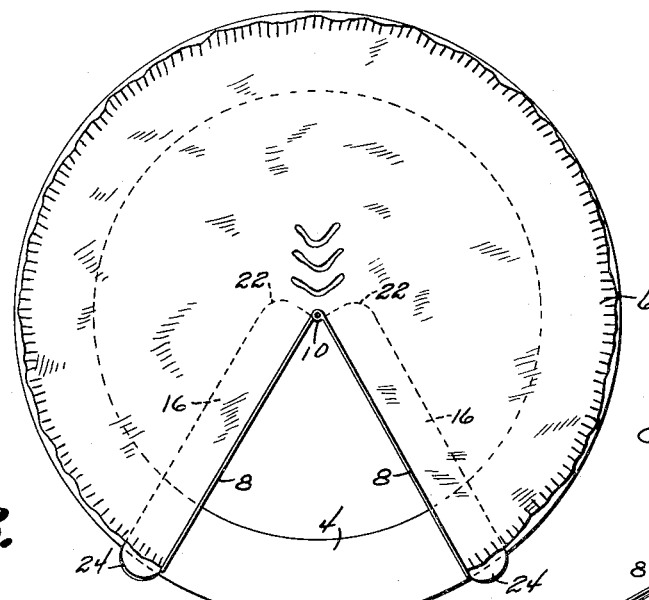
Fig. 1 is a top plan view of a pie and its plate showing the protector of our invention in position.
Figure 2:
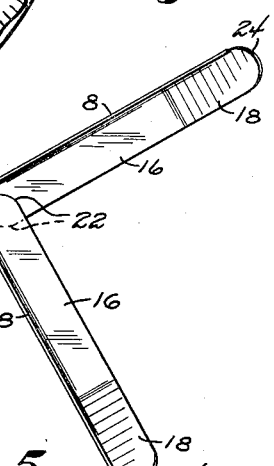
Fig. 2 is a top plan view of the protector with the walls expanded.
Figure 3:
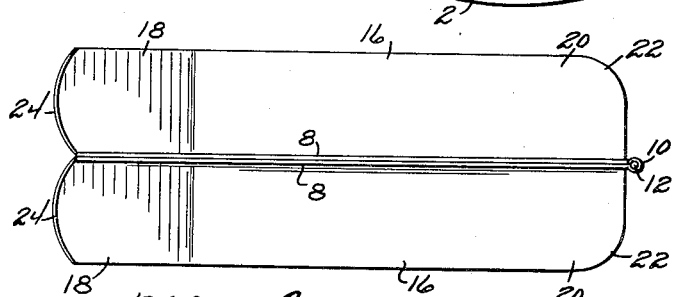
Fig. 3 is a similar view with the walls contracted, as for storing.
Figure 4:
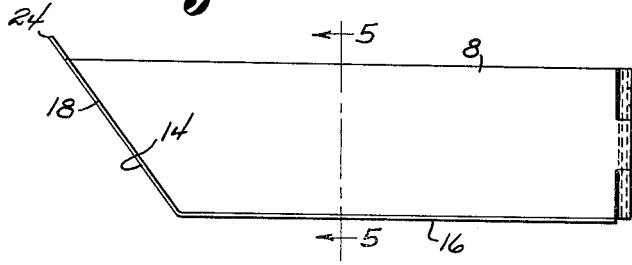
Fig. 4 is a side view of the protector.
Figure 5:
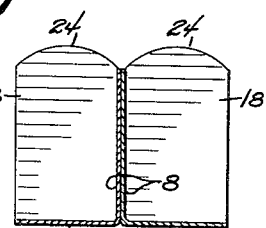
Fig. 5 is a sectional view at line 5—5 of Fig. 4.

Referring now to the drawings wherein we have illustrated the present preferred embodiment of our invention we show a conventional pie plate 2 having a beveled wall 4 in which is shown a pie covered by top crust 6. As shown, one slice of pie has been cut and removed.

Our protector comprises a pair of flat plates 8 of elongated shape and having forward ears 10 for pivot pin 12. Rearwardly the lower edge of each wall plate tapers upwardly as at 14 to conform to the beveled wall 4 of the pie plate, and each plate 8 has an angularly disposed base 16, the rear end portion of which is inclined as at 18.

The inner ends 20 of the bases are rounded as at 22 and overlap, and when the protector is positioned into the cavity of the pie, the plates 8 are pivoted so that the bases being outside slide under the pie and the plates 8 abut the open faces of the pie.

The walls may be pivoted from zero degrees to approximately 300 degrees being limited by the rounded noses of the bases.

The inclined portions of the bases extend at 24 beyond the pie plate periphery when inserted in the plate to afford a grip for expanding the protector so that the plates 8 will abut the open faces of the pie and protect and retain the filling.

Having thus fully described our invention what we claim as new and desire to secure by Letters Patent is:

1. A protector for the open faces of cut pies comprising a pair of flat walls pivotally secured together at one end, angularly positioned bases having upwardly inclined end portions on the walls and said walls and bases being expandable in the cavity of the pie to abut the open faces of the pie.

2. A protector for the open faces of cut pies comprising a pair of flat walls pivotally secured together at one end, angularly positioned bases having upwardly inclined end portions extending beyond the periphery of the pie on the walls and said walls and bases being expandable in the cavity of the pie to abut the open faces of the pie.

LILLIAN MILLER THIAC.
ARTHUR J. PETIVAN, Jr.

REFERENCES CITED

The following references are of record in the file of this patent:

UNITED STATES PATENTS

| Number | Name | Date |
|---|---|---|
| 168,437 | Wells | Oct. 5, 1875 |
| 348,839 | Grosz | Sept. 7, 1886 |
| 400,537 | Barry | Apr. 2, 1889 |
| 463,492 | Dean | Nov. 17, 1891 |
| 1,047,920 | Daution | Dec. 24, 1912 |
| 1,290,186 | Held | Jan. 7, 1919 |
| 1,526,397 | Thornton | Feb. 17, 1925 |
| 2,354,822 | Meyran | Aug. 1, 1944 |

FOREIGN PATENTS

| Number | Country | Date |
|---|---|---|
| 692,759 | France | Aug. 5, 1930 |
| 561,567 | Germany | Oct. 15, 1932 |